Nov. 29, 1960     A. G. OESTERLE     2,962,635
RELAY CONTROL CIRCUITRY

Filed Oct. 21, 1957

INVENTOR
ADOLPH G. OESTERLE

BY *Charles J. Elderkin*

ATTORNEY

United States Patent Office 2,962,635
Patented Nov. 29, 1960

2,962,635

RELAY CONTROL CIRCUITRY

Adolph G. Oesterle, Wyckoff, N.J., assignor to Electronic Communications, Inc., St. Petersburg, Fla.

Filed Oct. 21, 1957, Ser. No. 691,440

4 Claims. (Cl. 317—142)

This invention relates to electrical timing devices and more particularly to a novel circuit for accomplishing precisely timed actuation of an electrical control device such as a relay.

While many electrical circuits have been devised to control the actuation of a relay or the like, conventional circuits are frequently not completely satisfactory when the time period of operation of the control device must be very precisely controlled. This is particularly true when relatively short repetitive time periods are involved. It is accordingly a primary object of the invention to provide a novel circuit for actuating an electrical relay or the like at a precisely controlled point in time and for precisely controlling the period of time for which the relay will remain actuated.

A further object of the invention is to provide such a circuit wherein the control function of the relay may be accomplished through the timing circuit itself, or through circuit means extraneous to the timing circuit.

Another object of the invention is to provide an improved relay control circuit employing the combined effects of two control voltages to initiate energization of the relay and only the second control voltage, which is specially related to the first, to determine the period of time during which the relay is energized.

Yet another object of the invention is to provide such a circuit wherein the two control voltages are derived from the same source.

In order that the manner in which these and other objects are attained in accordance with the invention can be understood in detail, reference is had to the accompanying drawings, which form a part of this specification, and wherein.

Figure 1:
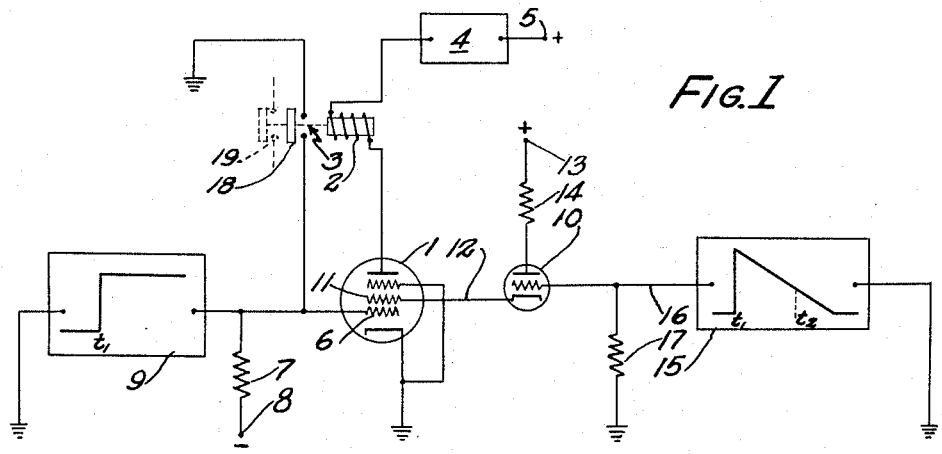
Fig. 1 is a schematic diagram of one embodiment of the invention.

Referring now to the drawings in detail and first to Fig. 1 thereof, it will be seen that the embodiment of the invention there illustrated includes a pentode 1 in the plate circuit of which is connected the actuating coil 2 of a relay 3. Also connected in the plate circuit is an electrical device 4 to be timed. The plate circuit is connected to positive B+ at 5. A negative biasing voltage is applied to control grid 6 of the pentode 1 in the usual manner via resistance 7 connected to B— at 8. Also connected to apply a control voltage to the grid 6 of pentode 1 is a voltage source 9 constructed to supply a control voltage which ascends with respect to the biasing voltage supplied via resistance 7.

The circuit also comprises a second electron tube 10, in this instance a triode having its cathode connected to control grid 11 of pentode 1 via conductor 12. The plate circuit of triode 10 leads to the positive B+ voltage at 13 via resistance 14. A second voltage source 15 is provided to supply a second control voltage which ascends simultaneously with the first control voltage supplied by source 9 and then descends, as shown by the wave form diagram. Instead of ascending simultaneously with the first control voltage, the second control voltage can ascend while the first control voltage is ascending or has levelled off. Control voltage source 15 is connected to the control grid of triode 10 via conductor 16 which is connected, at a point between source 15 and the triode, to ground via resistance 17.

Relay 3 is provided with a set of normally open contacts 18, one side of which is connected to the control grid 6 of pentode 1, the other side being connected to ground.

The bias voltage applied conventionally to control grid 6 of pentode 1 via resistance 7 may either be such as to bias the pentode to cut off, or to maintain the plate current of the pentode at such a low level that the relay 3 is not actuated. Noting the wave forms of the two control voltages supplied from sources 9 and 15, it will be understood that, at a point in time prior to completion of the descent of the second control voltage, the effect of the two control voltages will be such as to cause pentode 1 to conduct sufficiently to energize actuating coil 2 of relay 3. For example, this point in time can be $t_1$, indicated in the wave form diagrams for the first and second control voltages.

Actuation of relay 3 connects control grid 6 to ground, removing the biasing and first control voltages from the grid 6. At this point, the pentode is controlled solely by the second control voltage at grid 11. Pentode 1 will now continue to conduct, sufficiently to maintain relay 3 actuated, until the second control voltage descends to a predetermined lower value, as at time $t_2$. At time $t_2$, the plate current of the pentode is reduced sufficiently to cause relay coil 2 to be de-energized, contacts 18 opening, again applying the biasing voltage and permitting a control voltage to be again applied from source 9 to grid 6 of the pentode. It will thus be understood that the entire cycle of operation can be repetitive, depending upon whether or not the control voltages from sources 9 and 15 are periodic.

The circuit is advantageously employed to time an electrical device, as indicated at 4, which is connected directly in the plate circuit of the pentode. Alternatively, the relay 3 can be provided with additional contacts, indicated at 19, in order that operation of the relay can time a circuit or circuits extraneous to the circuit just described.

The voltage source 9 can be, for example, a conventional square wave generator. The second voltage source 15 can be any suitable wave shaping circuit operating in timed relation with source 9.

It will be noted that in the embodiment illustrated in Fig. 1, the two related control voltages employed to time the operation of the pentode, and thus the operation of the relay, are supplied by independent sources 9 and 15. Advantageously, these control voltages can be derived from a single source, as in the embodiment of the invention illustrated in Fig. 2. Here, the circuit remains the same as in Fig. 1, except that the phantastron circuit indicated generally at A is employed to derive the second control voltage from source 9.

The first control voltage, from source 9, is applied to the suppressor grid 20 of pentode 21, by means of the capacitor 22 and resistance 23.

The suppressor grid 20 has a small positive voltage applied to it via resistance 24 which is connected to the positive B+ voltage at 25. The voltage between the suppressor grid 20 and the cathode of the pentode is further controlled by the resistance 26. The screen grid 27 has a positive voltage applied to it through resistance 28 which is connected to the positive B+ voltage at 25. The value of the positive voltage applied to the screen grid is sufficient to cause most or all of the current to pass through the screen grid circuit when the control voltage from source 9 is not applied to the suppressor grid 20. When the control voltage from source 9 is applied to the suppressor grid 20, the voltage on the suppressor grid is raised sufficiently to cause the current to pass through to the plate 29 instead of only to the screen grid. The increase in the current to the plate causes the voltage at the plate to drop.

However, since the plate is connected to control grid 30 via capacitor 31, the drop in the positive voltage applied to the plate through resistance 32 is slight before the control grid voltage is reduced and the plate current is correspondingly reduced. As a result, the total cathode current is greatly reduced, as is the screen grid current, resulting in a sudden increase in voltage at the screen grid 27.

Part of the current to plate 29 passes through capacitor 31 and then through resistance 33, causing the voltage at the plate to fall at a linear rate dependent on the values of the resistance 33 and the capacitance 31. As this current decreases, the voltage at control grid 30 rises very slightly to permit the plate current to increase. The drop in voltage at the plate continues until it is slightly above ground potential. The voltage at the side of the capacitor not connected to the plate rises exponentially toward the value of the positive B+ voltage at 25. Because of this rise and the transfer of the space current from the plate to the screen grid 27 at the time the plate voltage was being reduced, the screen grid current is again increased and the screen grid voltage returns to its initial value.

When the control voltage from source 9 is removed from the suppressor grid 20, the plate voltage rises exponentially toward the value of the positive B+ voltage at a rate dependent on the values of the resistance 32 and the capacitor 31. The voltage at the plate can be used to supply the second control voltage, diagrammed at 34, which is applied to the control grid of the cathode follower 10. As an alternative, the voltage at screen grid 27 can be used as the second control voltage as diagrammed at 35, 32 which would then be applied to the control grid of the cathode follower.

Figure 2:
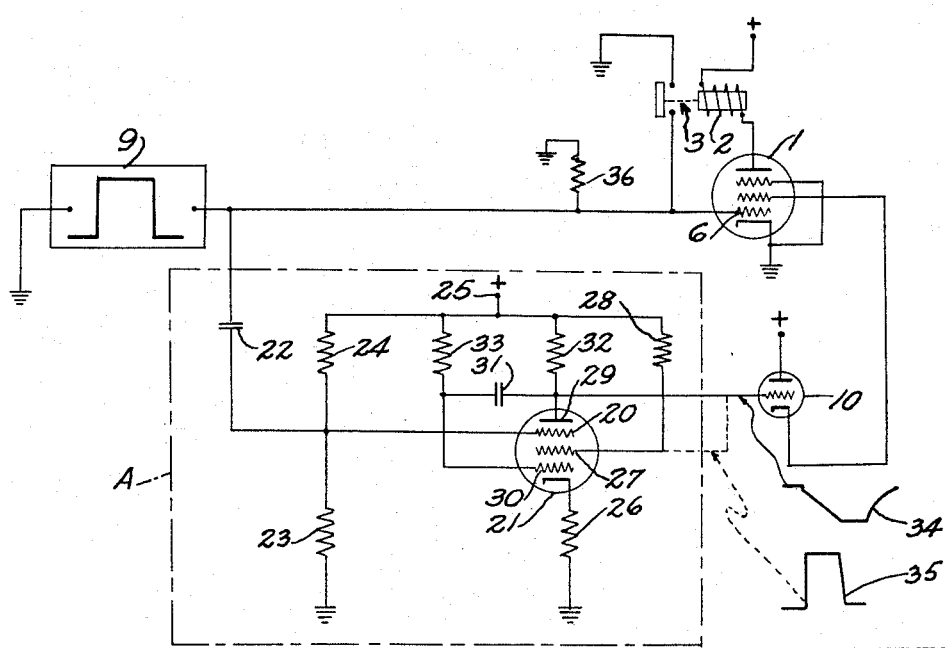
Fig. 2 is a schematic diagram of a second embodiment of the invention wherein two control voltages are derived from a single source.

It is thus seen that the phantastron circuit A of the embodiment of Fig. 2 serves to derive from the first control voltage, supplied by source 9, a second control voltage which has either the wave form indicated at 34 or that indicated at 35. In either case, the phantastron output rises simultaneously with the first control voltage and then has a descending slope useful, in the manner hereinbefore described with reference to Fig. 1, to determine the duration of the energization of relay 3. It will be understood that other types of wave shaping circuits can be substituted, in accordance with the invention, for the phantastron circuit A.

In Fig. 1, it will be observed that the conventionally applied bias voltage for the pentode 1 is derived from B— via the resistance 7. It is also convenient to obtain the bias voltage by connecting grid 6 to ground via a resistance 36, Fig. 2. In both cases, the first control voltage, derived from source 9, ascends with respect to the bias voltage.

I claim:

1. In an electrical timing circuit, the combination of an electron tube having a cathode, two control grids and a plate; the cathode of said tube being connected to ground potential; electro-responsive actuating means connected to said plate; a source of energizing voltage connected to said electro-responsive actuating means; circuit means connected to one of said control grids and operable to apply a biasing voltage thereto which is inadequate to make said tube sufficiently conductive to operate said electro-responsive actuating means; first control circuit means also connected to said one grid and operable to apply thereto a first control voltage ascending with respect to said biasing voltage; second control circuit means operable to supply a second control voltage ascending with respect to said biasing voltage and then descending; means connecting said second control circuit means to apply such second control voltage to the other of said control grids, the effect of said first and second control voltages at said grids at one point in time prior to completion of the descent of said second control voltage causing said tube to be sufficiently conductive to operate said electro-responsive actuating means under action of its source of energizing voltage; and means actuatable to reduce the effect of said biasing and first control voltages sufficiently to make conduction of said tube dependent upon said second control voltage, said means being arranged for operation by said electro-responsive actuating means.

2. In an electrical timing circuit, the combination of an electron tube having a cathode, two control grids and a plate; the cathode of said tube being connected to ground potential; a relay having normally open contacts and an actuating winding, said winding being connected to the plate of said tube for actuation of the relay by the plate current of the tube; a source of energizing voltage connected to said relay; circuit means connected to one of said grids to apply a given biasing voltage thereto inadequate to make said tube sufficiently conductive to operate said relay; a first control voltage source operable to supply a control voltage ascending with respect to said biasing voltage; means connecting said first control voltage source to said one grid; a second control voltage source operable to supply a second control voltage ascending with respect to said biasing voltage and then descending; means connecting said second control voltage source to the other of said grids, and a circuit connecting said one control grid to ground and including said contacts of said relay, whereby actuation of said relay completes such circuit to remove said biasing voltage and said first control voltage from said one grid; said first and second control voltages being effective at one point in time, prior to completion of the descent of said second control voltage, to cause said tube to be sufficiently conductive to operate said relay under action of its source of energizing voltage, and removal of said biasing and first control voltages from said one grid as a result of operation of the relay allowing conduction of said tube to be reduced, by descent of said second control voltage, to a point where the plate current of the tube is inadequate to operate the relay.

3. In an electrical timing circuit, the combination of an electron tube having a cathode, two control grids and a plate; the cathode of said tube being connected to ground potential; electro-responsive control means connected for actuation by the plate current of said tube; a source of energizing voltage connected to said electro-responsive control means; circuit means connected to one of said grids to apply thereto a given biasing voltage inadequate to make said tube sufficiently conductive to operate said control means; a source of changing voltage; first control circuit means connected between said source and said one grid to apply to said grid a first control voltage ascending with respect to said biasing voltage; second control circuit means connected to said source and operable to derive therefrom a second control voltage ascending with respect to said biasing voltage and then descending; means connected to said second control circuit means and to the other of said grids to apply said second control voltage to said other grid, the effect of said first and second control voltages at said grids at one point in time prior to completion of the descent of said second control voltage causing said tube to be sufficiently conductive to operate said electro-responsive control means under action of its source of energizing voltage, and means actuated by said control means to reduce the effect of said biasing and first control voltages sufficiently to make conduction of said tube dependent upon said second control voltage.

4. An electrical timing circuit in accordance with claim 3 and wherein said first control circuit means is operable to supply a cyclic voltage as said first control voltage and said second control circuit means includes a wave shaping circuit operable to supply a cyclic voltage as said second control voltage, said first and second control voltages ascending simultaneously.

References Cited in the file of this patent

UNITED STATES PATENTS

| | | |
|---|---|---|
| 2,483,126 | Davids | Sept. 27, 1949 |
| 2,519,763 | Hoglund | Aug. 22, 1950 |
| 2,731,559 | Marshall et al. | Jan. 17, 1956 |
| 2,833,967 | Faymoreau | May 6, 1958 |

OTHER REFERENCES

Stephenson application Ser. No. 598,171, abstract published December 20, 1949.